United States Patent [19]

Smith

[11] Patent Number: 4,713,823
[45] Date of Patent: Dec. 15, 1987

[54] PRE-COMBUSTION INTEGRATED RAM AIRBREATHING LASER

[75] Inventor: Eugene A. Smith, Vashon, Wash.

[73] Assignee: Northrop Corporation, Hawthorne, Calif.

[21] Appl. No.: 781,441

[22] Filed: Sep. 27, 1985

[51] Int. Cl.⁴ .............................................. H01S 3/09
[52] U.S. Cl. ..................................... 372/90; 372/701; 372/77; 372/58
[58] Field of Search ..................... 372/90, 701, 58, 59, 372/89, 77

[56] References Cited

U.S. PATENT DOCUMENTS 4,013,976 3/1977 Hill et al. .............................. 372/90

Primary Examiner—Leon Scott, Jr.
Attorney, Agent, or Firm—Terry J. Anderson; Robert B. Block

[57] ABSTRACT

The present invention provides a Ram airbreathing laser adapted to use with an aircraft which operates primarily in the Mach 3 to Mach 6 regime. Valves, or gates, are provided in the propulsive flow path and the auxiliary flow path for laser in a manner such that the air entering the aircraft engine inlet duct system is either directed to the laser or to the propulsive flow path depending upon the desired mode of operation of the aircraft.

16 Claims, 5 Drawing Figures

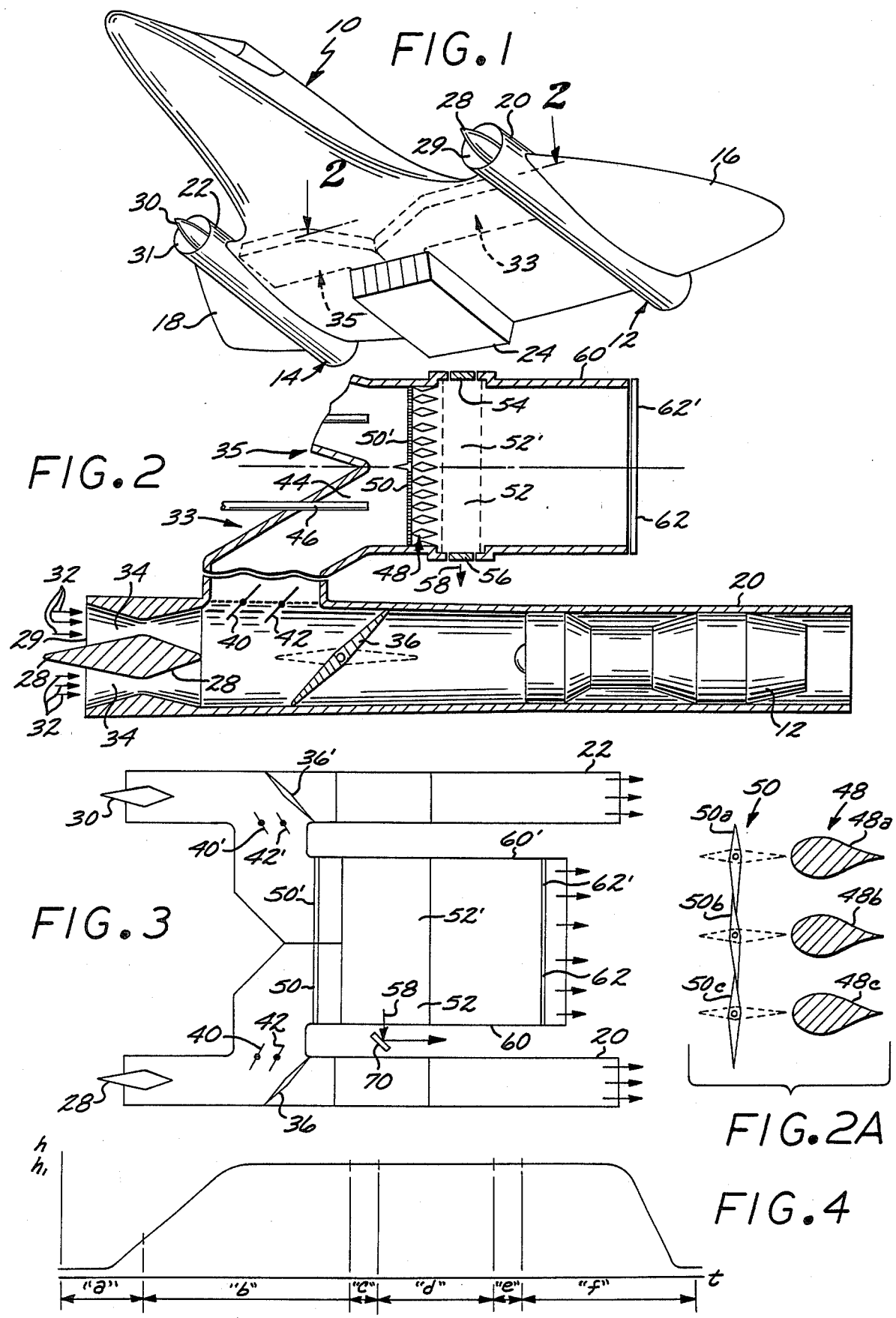

PRE-COMBUSTION INTEGRATED RAM AIRBREATHING LASER

BACKGROUND OF THE INVENTION

1. Field of the Invention

The present invention relates to a Ram airbreathing high power laser generally operable in the Mach 3 to Mach 6 regime.

2. Description of the Prior Art

Gas dynamic lasers use the principal of thermodynamically expanding a mixture of hot selected gases which are subsequently introduced into an optical resonant cavity where a population inversion in a species of the gases, typically $CO_2$, produces lasing action.

The open cycle gas dynamic laser (GDL) typically uses large quantities of stored gas for the laser working medium. A large fraction of laser weight is associated with the storage and conditioning of this gas, which is exhausted to the atmosphere after passing through the laser cavity. A large reduction in system weight is possible by replacing the stored gases (primarily $N_2$) with air (approximately 78% $N_2$ and approximately 21% $O_2$) and the combustion of appropriate fuels, such as benzene, to provide the proper lasant gas composition, temperature and pressure.

U.S. Pat. No. 4,013,976 discloses a GDL wherein combustion or compressor gases are diverted from the normal flow path through a gas turbine engine into an auxiliary flow path, the composition of the gases subsequently being modified to provide increased laser power.

The GDL of the type described in the aforementioned patent can be readily used on aircraft, the resultant laser beam being compatible primarily with relatively low to moderate power applications, due to the impact of the diverted gases on airplane performance, unless a dedicated engine is assumed. Although such an airborne GDL is relatively altitude and airspeed independent, its operating capability is generally better suited to Mach regimes less than about 3 where turbojet and turbofan engines typically operate.

Ram airbreathing lasers (RAL) operating in the Mach 3 to Mach 6 regime have been previously studied (Articles by M. J. Brunner, "Ram Airbreathing Laser Performance" AIAA paper 74-1139, 10th Propulsion Conference, San Diego, CA, Oct. 21-23, 1974 and "Ram Airbreathing Laser," General Electric Co., ARL TR 74-0036, Fluid Dynamic Facilities Research Laboratory/LF, Aerospace Research Facility, WPAFB, Ohio, May 1974). In particular, laboratory demonstrations have been performed to confirm the physics, and demonstration components have shown performance factors suitable for prototype development. Also, computer studies have been made of both the laser kinetics and operational applications. RAL's use air initially heated by ram compression in the engine inlet duct, the heated air being diverted to a mixing chamber wherein hydrocarbon fuel may be burned. Some RAL's, especially at high mach numbers, may not require an additive. Suitable thermodymamic expansion of the resultant gases produce a population inversion in the $CO_2$ species which then can be utilized to produce a laser beam. The high air mass flow rates possible and the high temperature gas resulting from the ram compression and the burning in the combustion chamber can result in lasers capable of producing a wide range of beam energies (low to high) which can be utilized in a variety of military and non-military applications.

Previously RAL's have been configured as generally self-contained systems. However, it would be desirable in a mobile vehicle, such as an aircraft or a missile, to integrate airvehicle and laser functions, such as pre-combustion functions (specifically those related to the air induction system) in a more efficient and cost effective manner than heretofore available.

SUMMARY OF THE PRESENT INVENTION

The present invention provides a Ram airbreathing laser particularly adapted to use on a high speed aircraft. Air from the inlet ducts of two turbo jet engines is directed to one of two paths associated with each engine depending upon the aircraft operating mode, the first path (one operating mode) leading to the jet engine and the second path to a laser system (second operating mode). The two turbo jet engines are provided on the aircraft to provide takeoff, climb and cruise thrust, with takeoff and climb thrusts supplemented, if necessary, by a rocket boost. During this period, the laser system combustion chamber is closed off from the engine inlet ducts, and air is supplied directly to the turbo jet engines through variable inlets. As the aircraft approaches the engagement area, it is accelerated to ram jet ignition speed, and the ram jet is started, the flight thus continuing at dash speed on ram jet power. During this period, the turbo jet engines are powered down and the valves in the inlet ducts positioned to close off the turbo jet engine faces the divert the air flow to the laser combustion chamber. The variable air inlet is positioned to provide the necessary laser flow requirements although the flow through an array of nozzles adjacent to the laser cavity is initially blocked by gates across the nozzle inlets. A diffuser, positioned downstream from the laser cavity has an exit gate which is open at this time in preparation for laser action. At the appropriate time, the laser is activated (fired) by burning the appropriate fuel in the combustion chamber and flowing the gasses through the now open nozzle array gates into the cavity where the laser light is extracted, the flow continuing through the diffuser and exhausting through the diffuser exit gate at the rear of the aircraft.

After firing, the nozzle array and diffuser exit gates are closed, the inlet valves repositioned for turbo jet operation, the ram jet thrust reduced to slow the aircraft to turbo jet start-up speed, and thrust transferred from the ram jets to the turbo jets. The aircraft then completes its operation (mission profile) on turbo jet power.

As is noted hereinabove, the use of a Ram airbreathing laser system provides significant advantages over the gas dynamic laser exemplified in the aforementioned reference. In the latter, engine gases are removed from the compressor or combustor sections, thus reducing the amount of gas flow through the turbo jet engines. Although this can be compensated for in other areas of aircraft design, overall aircraft performance is still negatively affected. In the Ram airbreathing laser system, large air mass flows are provided, typically on the order of several hundred lbs/second flow rate, as compared to the tens lbs/second flow rate that the aforementioned reference laser provides. A high inlet speed and appropriate inlet design provides a ram compression that allows the air to be initially preheated to a greater degree than the temperature of the air (gasses) bled from the compressor of the aforementioned reference configuration. The additional heating provided by a fuel burned in the laser combustion chamber provides the appropriate mixture of $CO_2$, $N_2$, $O_2$, $H_2O$, and CO, and raises the temperature of the gas mixture to the correct operating point by the time the gas mixture flows through the laser nozzle array into the optical resonant cavity. The mass flow available, together with the population inversion created, provides a $CO_2$ laser of a high power level.

The present invention thus provides several significant advantages over the prior art concept: (1) Better integration into the airvehicle by multiple usage of an air induction system common to both the laser and propulsion system, (2) higher power levels than achievable with the aforementioned reference, (3) less weight per firing time for a given power level, or higher power per firing time for a given weight than achievable with a conventional stored gas GDL, or with the aforementioned reference.

BRIEF DESCRIPTION OF THE DRAWING

For a better understanding of the invention, as well as further features and objects thereof, reference is made to the following description which is to be read in conjunction with the accompanying drawing wherein:

FIG. 1 is a perspective view of an aircraft in which the present invention may be utilized;

FIG. 2 is a cross sectional view along line 2—2 of FIG. 1;

FIG. 2A shows the nozzle array and gate member in more detail;

FIG. 3 is a simplified plan view of the aircraft shown in FIG. 1 schematically illustrating the basic components of the present invention; and FIG. 4 is a typical mission profile for the aircraft of FIG. 1 operating as a fighter interceptor.

DETAILED DESCRIPTION OF THE INVENTION

Referring now to FIG. 1, a perspective view of an aircraft 10 in which the present invention may be utilized is illustrated. It should be noted that the present invention may be used in other mobile vehicles, such as missiles. Aircraft 10 includes two turbo jet engines 12 and 14 mounted to wing portions 16 and 18 respectively. The turbo engines 12 and 14 are enclosed within aircraft skin or shroud 20 and 22 respectively. A ram jet 24 is mounted to the underside of the aircraft 10. Aircraft variable inlet devices, or spikes 28 and 30, are shown in conjunction with engine air inlet ducts 29 and 31 respectively. Aircraft 10, when operating as an interceptor, has a typical mission profile which as illustrated in FIG. 4 (profile is drawn as a function of time "t" and altitude "h"). In particular, during the time period "a", aircraft 10 takes off and initially climbs using the power of the jet turbo engines 12 and 14 and a supplemental booster such as a rocket, if necessary. During time period "b", there is a climb/cruise/loiter period during which only the jet turbo engines are operated. During time period "c", the plane is accelerated by using a higher power setting, an afterburner or other device such as a rocket (not shown) to the point of ignition of ram jet 24. During the portion of the flight profile represented by "d" the ram jet 24 is started, the turbo jets powered down and the laser systems 33 and 35 operated as will be described in detail hereinafter. During time period "e", aircraft 10 is decelerated to the point where the jet turbo engines 12 and 14 are restarted as the ramjet turned off. During time period "f", aircraft 10 cruises and then lands using the turbo jet engines 12 and 14.

Referring now to FIG. 2, a cross-sectional view along line 2—2 of FIG. 1 showing only turbo jet engine 12 and laser system 33, jet engine 14 and laser system 35 operating in an identical manner. Air, represented by arrows 32, enters the ram compression area 34 through the engine inlet duct 29 where the air is preheated by the compression caused by the shape/area of the inlet duct 29 and the axial position of spike 28. For the aircraft operative mode illustrated (engine 12 powered down) valve 36 is positioned as shown. In this mode, a pair of valves 40 and 42 (the number and configuration of the valves may differ for various embodiments) are placed in the open position (valve positioning being controlled automatically or by the aircraft pilot) such that the incoming preheated air is diverted to a reservoir/combustion chamber 44, the purpose of which is to smooth out pressure fluctuations and allow mixing and combustion of the air with a fuel, such as benzene, which can be injected through an injection valve 46. The temperature immediately prior to expansion of the resultant gas mixture is important if high laser powers are to be provided. Preheating of the air by ram compression and the heating of the gas mixture due to combustion in chamber 44 provides a high temperature gas mixture typically in the range from 1400° K. to about 2500° K. at the combustion chamber discharge. Having obtained a suitable composition in reservoir/combustion chamber 44, the gases are passed through an array of convergent/divergent nozzles 48 via nozzle gate 50. The nozzles are of such proportions as to produce supersonic expansion in the divergent portions of the nozzles. The nozzles may be the type commonly known as "slot" nozzles or "2-D" nozzles and arranged in this manner so that a sufficiently long optical path may be provided in optical cavity 52. Optical cavity 52 is bounded by mirrors 54 and 56 to form the resonator with which the laser light is extracted.

Optical cavity 52 is designed to have space for the expanded gases and provides "resonance", i.e. any laser radiation resulting from the population inversion is reflected backwards and forwards along the optical path of the mirrors 54 and 56, thereby stimulating further laser emission. The optical path is thus disposed traversely of the gas flow through the nozzles and parallel to the row of nozzles. Assuming that the optical cavity 52 is correctly constructed, aligned and positioned, a laser beam 58 will result when conditions in the gas stream conform to the necesssary laser requirements (due to the nature of the gases provided in the gas mixture and the temperatures and pressures involved, the laser optical cavity operates as a $CO_2$ laser).

After passing through the optical cavity 52 and expanding to its full extent in the expansion chamber associated with the optical cavity, the gas pressure in the cavity will typically be lower than atmospheric unless lasing action occurs in aircraft 10 at very high altitudes. Since the exhaust gases must be removed from the apparatus, it is necessary to provide a diffuser 60 to exhaust the gases from the cavity 52. A diffuser gate 62 is mounted to the rear of diffuser 60 as illustrated. As noted hereinabove, large quantities of air flow is provided by the present invention which allows a higher power laser beam 58 to be produced than available from prior art gas dynamic lasers of similar weight and volume. Typically the air flow entering the engine inlet duct 29 is in the range of several hundred lbs/second (supersonic) as compared to flow rates typically less than 100 lbs/second for prior art gas dynamic lasers of similar weight and volume. It should be noted that spike 28 can be axially moved to optimize operation of the air induction system of the aircraft 10. However, in the Mach regimes that aircraft 10 is designed to operate, the position of spike 28 is optimized independently for Mach number/altitude combinations for either propulsion or lasing. In comparison thereto, the gas dynamic laser of the type described in the aforementioned patent reference would utilize axial positions of spike 28 to optimize the combined operation of propulsion and laser in such an aircraft. Thus the present invention involves a tradeoff, i.e. providing a higher power laser several magnitudes greater than that provided by the prior art gas dynamic laser whereas overall performance of the aircraft 10 may be less than optimal for other altitudes and Mach regimes.

In operation, two turbo jet engines 12 and 14 are used to initially provide takeoff, climb and cruise thrust, with takeoff and climb thrust supplemented, if necessary, by a rocket boost. During this period, valves 40 and 42 are in the closed position, (illustrated in phantom) preventing air from entering the reservoir/combustion chamber 44 and valve 36 is in the open position (illustrated in phantom) allowing the air to directly flow to the turbo jet engine 12. Approaching the engagement area, aircraft 10 is accelerated to RAM jet ignition speed, the RAM jet 24 being started, and the flight continued at dash speed on RAM jet power. During this period the turbo jet engine 12 is powered down, valve 36 positioned as shown in solid in FIG. 2 to close off the turbo jet engine face and to divert the air flow to the laser combustion chamber 44. In this case, valves 40 and 42 are in the open position indicated in solid in FIG. 2. Spike 28 is positioned in the axial direction to configure the variable inlet in the manner to provide the necessary mass flow for the laser (typically about 0.05–0.10 lbs/seconds per kw). However, the flow to the laser nozzle array 48 is blocked by nozzle gate (typically a series of small gate members) 50, across the nozzle inlets. The laser diffuser exit gate 62 is also open at this time in preparation for firing of the laser. FIG. 2A illustrates the nozzle array 48 and nozzle gate 50 in more detail, the former including a plurality of nozzle members 48a, 48b, 48c . . . , and the latter a plurality of gates 50a, 50b, 50c, the gates indicated in solid being in the closed position, the gates in phantom being in the open position. Preferably, the gates overlap in the closed position.

During engagement, laser beam 58 is generated by burning the appropriate fuel, such as benzene, in the combustion chamber 44 and flowing the gas mixture through the open nozzle gates and the nozzle array 48 into cavity 52 where the laser light 58 is extracted, the gas flow continuing through the diffuser 60 and exhausting through the diffuser exit gate 62 toward the rear of the aircraft 10.

After engagement, the nozzle gate 50 and and diffuser exit gate 62 are closed, the inlet valves 36, 40 and 42 repositioned for turbo jet operation, the ram jet thrust reduced to slow aircraft 10 to turbo jet start-up speed regime and the thrust then transferred from the ram jets to the turbo jets. The aircraft 10 then completes the mission profile shown in FIG. 4 on turbo jet power. It should be noted that the laser beam 58 is repositioned by a series of mirrors (not shown) such that the beam itself does not interfere with the adjacent nacelle 20 which incorporates the turbo engine 12. Gate 50 is closed prior to and after lasing action to keep the optical cavity 52 clean and the diffuser gate 62 is closed to prevent contaminants from being trapped in the diffuser 60 and thereby interfering with laser operation.

FIG. 3 is a simplified plan view of that portion of the aircraft 10 of FIG. 1 showing the basic components of the ram airbreathing laser system of the present invention. In particular, the system includes two inlet systems, combustion chambers and nozzle gates and a single optical cavity, with a single or multi-pass resonator (single pass resonator is shown in the figure). As shown in FIG. 3, a mirror member 70 can be mounted adjacent to the nacelle 20 such that the laser beam 58 can be directed to pointing optics (not shown). Except for mirror member 70, the upper half of the shown in FIG. 3 (and shown in FIG. 2) is a mirror image of the lower half and the corresponding elements illustrated operate in an identical manner, the upper half elements being referenced by the identical reference numerals (except for the prime factor).

The present invention thus provides an improved Ram air-breathing laser which allows higher laser powers to be provided than the prior art gas dynamic lasers. Further, the present invention provides an improved Ram airbreathing laser which contains means for controlling the direction of flow of the compressed air entering the engine inlet duct in a rapid and efficient manner allowing for effective operative control of a Ram airbreathing laser aircraft. The present invention also provides gated nozzles and a gated diffuser to protect the optical cavity when lasing action is not required and is adapted to operate efficiently on aircraft flying at speeds primarily in the Mach 3 to Mach 6 regimes at high altitudes, the laser beam generated being of sufficient power to operate in applications requiring a high energy beam.

While the invention has been described with reference to its preferred embodiments, it should be understood by those skilled in the art that various changes may be made and equivalents may be substituted for elements thereof while not departing from the true spirit and scope of the invention. In addition, many modifications may be made to adapt a particular situation or material to the teaching of the present invention without departing from its essential teachings.

What is claimed is:

1. A Ram airbreathing gas dynamic laser provided on a mobile air vehicle having both a jet engine and a RAM type engine, comprising:
   an air inlet duct directing air exterior the vehicle to the jet engine; the entrance to said inlet duct having a constricted inner diameter which preheats entering air when the mobile air vehicle is moving at high Mach speeds;
   nozzle gate means positioned for diverting substantially all of said preheated air from said jet engine to a reservoir/combustion chamber when said mobile air vehicle is operating on RAM engine power; said chamber having means for introducing fuel to said air and burning resulting air-fuel mixture;
   a gas dynamic laser connected to the reservoir/combustion chamber, said laser including: means for aerodynamically expanding a burned air-fuel mixture supersonically, and an optical resonant cavity for stimulating lasing in said burned mixture; and
   means for exhausting said burned mixture after passage through said gas dynamic laser.

2. The laser of claim 1 wherein said gate means is positioned such that said inlet air is supplied directly to said jet engine when said mobile air vehicle is operating on jet engine power.

3. The laser of claim 1 wherein said fuel is a hydrocarbon.

4. The laser of claim 3 wherein said hydrocarbon comprises benzene.

5. The laser of claim 1 wherein said means for aerodynamically expanding said burned mixture supersonically includes a plurality of nozzles positioned adjacent to and upstream from said gas dynamic laser, said nozzles being shaped to produce supersonic flow of the burned mixture as the burned mixture enters said optical resonant cavity.

6. The laser of claim 5 wherein gate means are provided upstream from and adjacent to said nozzles to prevent air from entering said optical resonant cavity when said laser is not operating.

7. The laser of claim 1 further including a diffuser positioned downstream from said resonant cavity.

8. The laser of claim 7 further including outlet gate means positioned at a fluid outlet of said diffuser, said gate means being closed when said mobile air vehicle is operating on jet engine power.

9. The laser of claim 1 wherein means are provided in said air inlet for varying an air flow path cross-sectional area to optimally preheat entering air for lasing in said gas dynamic laser when said mobile air vehicle is operating on RAM power.

10. The laser of claim 9 wherein said size varying means provides optimal entering air conditions for jet engine propulsion when said mobile air vehicle is operating on jet engine power.

11. A RAM airbreathing laser integrated into an airborne vehicle having both a turbo-jet engine and a RAM type engine, comprising:
an air inlet duct connected to an exterior surface of the vehicle and to an inlet of the turbo-jet engine and directing air from outside the vehicle to the turbo-jet engine, said inlet duct having an entrance portion with a constricted inner diameter compressing and heating air entering the inlet duct to produce high air mass flow rates;
a by-pass duct connected to the inlet duct;
a combustion chamber connected to the by-pass duct, so that pressure fluxations in air traveling through the inlet and the by-pass ducts and introduced into the combustion chamber are reduced;
valve switching means, connected to the inlet duct, for substantially stopping air flow from the inlet duct to the jet engine and instead directing air into the by-pass duct when the vehicle is powered by the RAM type engine;
means for introducing lasing compounds into air in the combustion chamber and burning a resulting air-lasing compound mixture;
an optical laser cavity structure having along one wall thereof an array of aerodynamically configured nozzles, connected to the combustion chamber, producing supersonic expansion in the burned air-lasing compound mixture exiting the combustion chamber; and
diffuser means, connected to the optical cavity, for removing gasses from the laser cavity structure.

12. The laser of claim 11 further comprising means for varying a cross-sectional area through which air flows in the constricted inner diameter portion of the inlet duct, wherein said cross-sectional area may be varied to independently obtain improved jet engine operation or improved laser operation.

13. The laser of claim 12 wherein said area varying means includes an aerodynamically configured spike mounted within the inlet duct and movable along a longitudinal axis of the duct.

14. The laser of claim 11 further comprising valve means, communicating with the combustion chamber, for substantially sealing off a flow of gases from the combustion chamber to the optical cavity.

15. The laser of claim 11 further comprising valve means, communicating with the diffuser means, for substantially sealing off a flow of gasses from the diffuser means to outside the vehicle.

16. An airbreathing laser integrated into an airborne vehicle having both a turbo-jet and high mach number capable RAM type engine, comprising:
an air inlet duct connected to the exterior of the vehicle and an intake of the turbo-jet engine and directing air from outside the aircraft to the jet engine, said inlet duct having an entrance portion with a constricted inner diameter which produces high air mass flow rates as a result of compressionally heating air entering said inlet duct, said inlet duct of further including means for varying an air flow path cross-sectional area through said constricted entrance portion to alternately obtain optimum jet engine performance or optimum laser operation;
a bypass duct connected to the inlet duct downstream from the constricted entrance portion and upstream from the jet engine intake;
valve switching means, connected to the air inlet duct and the bypass duct, for stopping a flow of air from the inlet duct to the jet engine intake and instead directing an air flow to the bypass duct;
a combustion chamber, connected to the bypass duct, including means for introducing lasing compounds into the combustion chamber and combustion means for inducing combustion in a lasing compound and air mixture to produce a lasing gas mixture;
a gas dynamic type ram laser cavity structure including a plurality of aerodynamically configured expansion nozzles connected to the combustion chamber and producing supersonic expansion in the lasing gas mixture from the combustion chamber to obtain stimulated optical emissions from the lasing gas mixture in the laser cavity structure;
valve means, disposed between the combustion chamber and the laser expansion nozzles, for sealing off a flow of the lasing gas mixture from the combustion chamber to the laser cavity structure and the laser nozzles;
diffuser means, connected to a downstream side of the laser cavity structure, for removing the lasing gas mixture from the laser cavity structure and expelling the lasing gas mixture outside the vehicle, and
valve means, connected to the diffuser means, for sealing off a flow of the lasing gas mixture from the diffuser to the exterior of the vehicle.

* * * * *